United States Patent [19]
Brodie

[11] Patent Number: 5,400,924
[45] Date of Patent: Mar. 28, 1995

[54] ABOVE-GROUND FUEL TANK SYSTEM

[76] Inventor: Richard G. Brodie, 25657 N. 17th Ave., Phoenix, Ariz. 85027

[21] Appl. No.: 90,773

[22] Filed: Aug. 13, 1993

[51] Int. Cl.⁶ .............................................. B67D 5/00
[52] U.S. Cl. .................................. 222/108; 222/173; 222/183; 220/571; 137/312
[58] Field of Search ............... 222/108, 173, 608, 129, 222/131, 183, 52; 220/571; 141/86, 88; 137/312, 376

[56] References Cited

U.S. PATENT DOCUMENTS

| | | | |
|---|---|---|---|
| 2,339,287 | 1/1944 | Neef, Jr. | 222/173 |
| 2,944,563 | 7/1960 | Blasio et al. | 137/312 |
| 3,366,280 | 1/1968 | Sampson et al. | 222/173 |
| 4,834,150 | 5/1989 | Gädke et al. | 222/23 X |
| 4,895,272 | 1/1990 | De Benedittis et al. | 137/312 X |
| 4,948,010 | 8/1990 | Wiggins | 222/67 X |
| 4,960,222 | 10/1990 | Fields, III | 220/571 X |
| 4,986,446 | 1/1991 | Montgomery et al. | 222/173 X |
| 4,988,020 | 1/1991 | Webb | 222/608 |
| 5,082,034 | 1/1992 | Soper | 222/173 X |
| 5,088,530 | 2/1992 | Harp | 141/88 X |
| 5,114,046 | 5/1992 | Bryant | 222/108 |
| 5,197,627 | 3/1993 | Disabato et al. | 220/571 |
| 5,201,435 | 4/1993 | Harding et al. | 220/571 X |
| 5,259,527 | 11/1993 | Gates | 220/571 |
| 5,284,191 | 2/1994 | McGarvey | 141/86 X |

FOREIGN PATENT DOCUMENTS 2209183  5/1989  United Kingdom ............... 220/571

Primary Examiner—Andres Kashnikow
Assistant Examiner—Anthoula Pomrening
Attorney, Agent, or Firm—Martin L. Stoneman

[57] ABSTRACT

In an above ground fuel storage system, a containment vessel is selected to resist impact shock, as well as deformation from fire's heat and internal hydraulic pressures in the presence of such heat. The fuel delivery input port, the fuel tank, all fuel lines and dispensing equipment are mounted fully enclosed within the confines of the containment vessel. The containment vessel may be transportable or be permanently emplaced on use site. Solar energy is utilized to allow operation in undeveloped areas. A remote control device permits system shut down to be initiated from a distance.

20 Claims, 1 Drawing Sheet

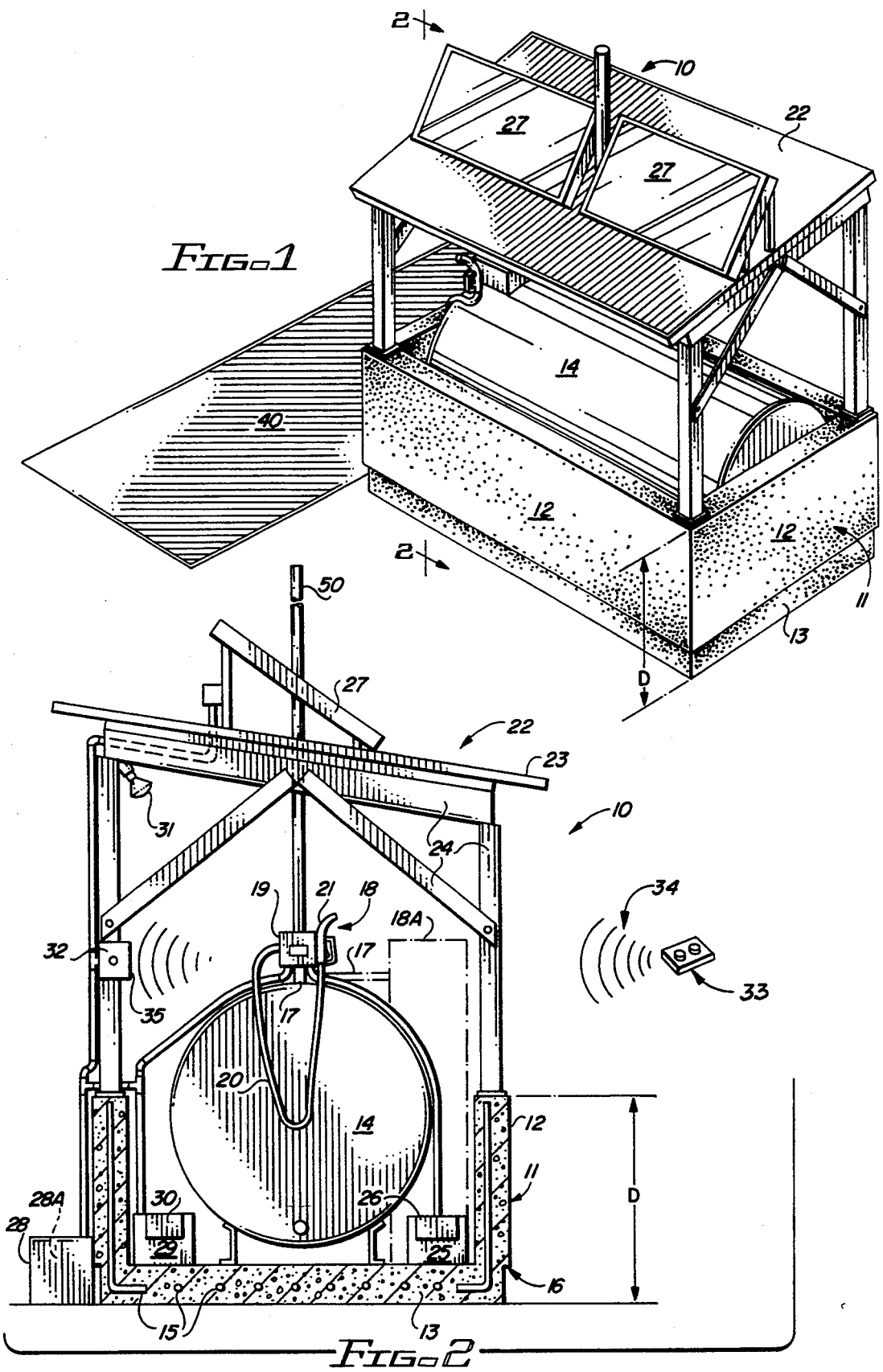

ABOVE-GROUND FUEL TANK SYSTEM

BACKGROUND

1. Technical Field of the Invention

The invention relates to the field of fuel storage facilities. In particular, the invention relates to above ground, transportable, fuel storage in which fuel tank is mounted in a containment vessel to therein contain leaks and spills. The use of a solar/electric conversion array provides for powered use of the facility in non-developed areas.

2. Prior Background Art

The environment, long ignored, battered and destroyed, is finally receiving a modicum of consideration. This is especially true in the United States. One area of significant concern to environmentalists and the people next door is the leaking of fuels and hydrocarbon products into the earth. Leakage of these materials from fuel tanks and the like migrates through the ground and contaminates water supplies as well. These materials are defined as hazardous.

In this specification, the terms "fuel tank," "fuel dispenser," "fuel dispensing means" or the like are to be considered to be generic descriptors for all hazardous liquids which must be stored and dispensed.

The storage of gasoline at a gas station exemplifies the problem. Underground storage facilities have been used at gas stations for decades. Over the course of years, underground fuel storage tanks tend to deteriorate and develop leaks. A small leak may go unnoticed by inspection of product inventory and sales for long periods of time. Though at first unnoticed, leakage can be significant over time and contaminate neighboring land and underground waters.

In the past it has been common practice to ignore found leaks so long as the cost of the leakage was less than the anticipated cost of digging up and replacing the faulty tank. But for strict environmental protection laws, the temptation to delay replacement of a leaky underground storage tank might be even greater today when removal of a leaky tank also means removal of all soil contaminated by the leak.

Solutions to the problem abound. For example, U.S. Pat. No. 4,978,249 was issued to Troy Killman on Dec. 18, 1990 for a safe, underground, fluid-storage system. Fuel tanks were to be stored underground in water tight containment vessels. A removable cover provided access for inspection, maintenance and tank replacement. Installation costs for such a system could be significant.

An above ground solution was suggested by Billy Bryant in U.S. Pat. No. 5,114,046. Here, a fuel tank was placed in a transportable, metal wall containment vessel. The metal walls are ridged to strengthen the them to resist impact by vehicles and the like to protect the tank inside the vessel. Judging by Bryant's drawings, the relatively thin metal walls will offer only nominal resistance to vehicular impact and are likely to distort under fire induced heat. Where fire and a significant tank leak are both present, it is to be questioned whether Bryant's walls will withstand the combined effect of heat and hydro-pressure induced distortions.

Although Bryant attempts to protect his fuel dispensing equipment from vehicular impact, he places his dispenser outside the wall of the containment vessel. This arrangement suffers in that spills and leakage at the dispenser will fall outside the containment vessel. Further, Bryant breaches the side wall of his containment vessel in order to bring a fuel line from the fuel tank (inside the vessel) to the fuel dispenser (outside the vessel). This arrangement threatens water tight integrity of the vessel and, if the breach is sealed, probably transmits impact shock directly from the wall to the fuel line. An impact shock could thereby rupture the fuel line and allow the tank to drain to the earth outside the containment vessel.

It is an objective of the invention to offer an improved solution to the problem of safely storing liquid fuels and the like above ground. A containment vessel which is strong enough to be transported with fuel tank and distribution and dispensing equipment installed within the vessel will be disclosed. The vessel's strength will provide the vessel with characteristic, functioning resistance to impact shock, fire-induced heat, and interior, fluid-induced pressures. A self contained energy source will permit storage and dispensing operations to be carried out in non-developed areas.

SUMMARY DESCRIPTION OF THE INVENTION

Given: a prior art, above ground fuel storage and dispensing apparatus which has a rectangular support frame with an outer perimeter. The frame includes a bottom, and vertical side walls around the perimeter forming an open-top containment vessel. There is a fuel tank with a predetermined volume mounted on the frame within the side walls and bottom.

The containment vessel has a volume larger than the volume of the fuel tank for containing all the fuel from the fuel tank in the event of a fuel tank leak. The fuel tank has a horizontal perimeter formed by its maximum horizontal dimensions. The vertical side walls of the frame are spaced outwardly from the horizontal perimeters of the fuel tank in all horizontal directions. The walls are of a sufficient size and strength to protect the fuel tank from horizontal external impacts by vehicles and the like.

There is a fuel line connected to the tank, and means for dispensing fuel connected to the fuel line.

The invention itself is disclosed in three presently preferred embodiments, each representing an improvement in the prior art, above ground, fuel storage and dispensing apparatus.

In a first embodiment, the improvement includes a source of electrical energy wherein the source of electrical energy is a solar array mounted on the containment vessel for converting sunlight into electrical energy. There is an electrical battery coupled to the solar array for storing excess electrical energy converted by the solar array during periods of sunlight. The battery dispenses electrical energy during periods of obscured sunlight and darkness.

The addition of means coupled to the support frame for reducing the emission into the atmosphere of volatile organic compounds from the fuel tank, and of wireless remote control means coupled to the means for dispensing fuel for disabling the dispensing means from a remote position of safety should an emergency arise, completes the first disclosed embodiment of the invention.

In a second embodiment, wireless remote control means are coupled to the means for dispensing fuel for disabling the dispensing means from a remote position of safety should an emergency arise. This embodiment includes the addition of a solar array mounted on the containment vessel for converting sunlight into electrical energy. As before, an electrical battery is coupled to the solar array for storing excess electrical energy converted by the solar array during periods of sunlight and dispensing electrical energy during periods of obscured sunlight and darkness.

Finally, means are coupled to the support frame for reducing the emission into the atmosphere of volatile organic compounds from the fuel tank.

The third embodiment of the improvement is made up of the open top containment vessel being a transportable reinforced concrete (or other selected containment vessel for resisting the impacts of vehicles and the like, and for retaining its conformation under extreme conditions of fire induced heat and hydraulic pressure. The vertical side walls are so mechanically affixed to the bottom; and the bottom is of such sufficient size and strength to support the reinforced concrete containment vessel with the fuel tank, fuel line, and dispensing means therein during transport.

The vertical side walls, while high enough to contain all fuel from the tank, are low enough to permit safe entry and exit of personnel to and from the containment vessel. All fuel lines are free of supporting contact with the vertical side walls so as to isolate the fuel lines from shock induced by impact forces imparted to the side walls. The fuel lines and the means for dispensing fuel are positioned and mounted within the containment vessel for containing within the vessel any fuel leaks or spills from the fuel lines and the dispensing fuel means.

In addition, there are means affixed to the support frame for reducing emission into the atmosphere of volatile organic compounds from the fuel tank.

Other modifications of this third embodiment are disclosed, as well. For example, the means for reducing emissions of volatile organic compounds from the fuel tank is disclosed as means for reducing daytime through night time temperature range variations within the tank. This, in turn, is shown to be means for reducing the accumulation of rain and snow within the containment vessel. A common means fulfilling all these requirements is disclosed to be a roof canopy above the containment vessel.

The means for dispensing fuel comprises a pump which may be energized by fuel drawn from the fuel tank. On the other hand, the pump may be electrically driven since a source of electrical energy is coupled to the containment vessel for transport therewith. The source of electrical energy may be a motor driven electric generator energized by fuel drawn from the fuel tank, or, alternatively, an electric-motor driven generator.

Preferably, the source of electrical energy is a solar array mounted on the containment vessel for converting sunlight into electrical energy. An electrical battery is coupled to the solar array for storing excess electrical energy converted by the solar array during periods of sunlight and dispensing electrical energy during periods of obscured sunlight and darkness.

Safety features include lighting means coupled to the source of electrical energy for permitting safe use of the dispensing means during night time hours. Also, wireless remote control means are coupled to the fuel dispensing means for disabling the dispensing means from a remote position of safety should an emergency arise.

BRIEF DESCRIPTION OF THE DRAWINGS

FIG. 1 is a perspective view of the above ground, fuel tank system disclosed herein.

FIG. 2 is a side, sectional elevational view taken along lines 2—2 of FIG. 1.

DETAILS OF BEST MODE FOR CARRYING OUT THE INVENTION

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

FIG. 1 is a perspective view of the above ground fuel storage and dispensing system disclosed and claimed herein. FIG. 1 provides orientation for the sectional elevational view of FIG. 2 which is taken along line 2—2 of FIG. 1. Both FIGS. 1 and 2 may be referred to during the course of the following discussion.

A rectangular support frame forms containment vessel 11. Vessel 11 is comprised of generally vertical side walls 12 disposed about the perimeter of vessel bottom 13. A fuel tank 14 is mounted within containment vessel 11. Vessel 11 has a volume equal to at least 100% of the volume of tank 14 so that the entire contents of tank 14 will be retained within vessel 11 should tank 14 rupture or sustain an undetected leak of long duration. Preferably, leak detectors within vessel 11 (not shown) will prevent the latter event from occurring.

The horizontal dimensions of vessel 11 are determined by the horizontal dimensions of tank 14, by whether more than one fuel tank is emplaced within vessel 14, and by the space required for operational support apparatus, such as pumps and generators. The size and strength of side walls 12 are determined by an additional function of those walls: protecting tank 14 from shock forces induced by vehicular impact against the outer surfaces of walls 12.

A fuel line 17 connects tank 14 to fuel dispensing means 18.

To this point, all the apparatus discussed can be found in the prior art. However, as noted in the Background discussion above, the prior art left much to be desired. The invention, as now to be disclosed, represents an innovative and distinctive improvement in the prior art.

While the prior art produced a containment vessel strong enough to protect the fuel tank from the effects of vehicular impacts on the vessel's walls, this was achieved by constructing walls 12 of vessel 11 from relatively thin metal. The danger then exists that, in the event of a fuel-fed fire, the metal walls will distort and buckle under the heat load produced by the fire. Should fuel tank 14 rupture under these conditions, the problem is exacerbated. Hydraulic pressure from fuel rushing into containment vessel further tends to buckle and distort walls 12. The result is a rupture in the walls of vessel 11, the potential spread of fire, and the probable pollution of the earth and ground waters by a hazardous substance.

To avoid these potential dangers, the containment vessel of the invention is preferably fabricated of selected materials, such as, for example, reinforced concrete, as indicated in FIG. 2. The selected material will resist heat and hydraulic pressure deformation as well a resisting damage from vehicular impact. Reinforcement bars (re-bar) 15 add strength to the concrete walls 12 permitting those walls to withstand impact from vehicles and the like with little or no damage, therefore protecting tank 14 from shock forces. The concrete itself will not buckle and distort under fire induced heat loads. Nor will an in-rush of fuel from tank 14 cause containment vessel 11 to fail, even in the presence of a fire-heat load.

Another advantage accrues from the use of reinforced concrete in fabricating containment vessel 11. As seen in FIG. 2, the walls 12 are an integral part of the bottom 13 of the vessel. Reinforced concrete bottom 13 is of sufficient size and strength to permit containment vessel 11 to be transported with fuel tank 14, fuel lines 17, and fuel dispensing means 18 emplaced within the vessel.

Containment vessel 11 is constructed so that a lifting lip 16 is provided at the base of walls 12. By placing jacks about vessel 11 and engaging the jacks with lifting lips 16, vessel 11 may be raised up above the ground for placement on a trailer or the like for transport. The illustration of lifting lips 16 is exemplary only and is not to be taken as limiting the manner in which vessel 11 may be raised for transport.

As an added, personnel safety precaution, walls 12, while high enough to contain the entire contents of tank 14, are maintained low enough in height D to permit safe and rapid entry to and exit from vessel 11.

As noted in FIG. 2, all apparatus within vessel 11, including tank 14, fuel lines 17 and dispensers 18, are free of contact with walls 12. This is done intentionally to prevent the transference of impact shocks from walls 12 to any apparatus within vessel 11.

Fuel dispenser 18 may be simple and utilitarian when the system 10 is used for non-commercial purposes, as on a farm or trucking depot. To this end a simple pump 19 draws fuel from tank 14 via fuel line 17. The fuel so drawn is transferred via flexible hose 20 and fuel dispensing nozzle 21 to the vehicle or other device requiring refueling.

System 10, however, lends itself to public, commercial uses, as at a gasoline service station. In this event a more attractive, standard commercial fuel dispenser 18A (shown in phantom outline) may be utilized.

When fuel tank 14 is subjected to the heat of the sun, gaseous vapor pressures increase inside the tank. As these pressures rise, a point is reached at which the pressure must be relieved. When this occurs, gaseous vapors of volatile organic compounds are vented to the atmosphere through vent pipe 50. Even when filter traps are employed, some gaseous vapors will be introduced to the environment. To preclude or reduce the introduction of these vapors into the atmosphere, means are provided to reduce sun loading on tank 14 thereby reducing the range of temperature differentials experienced by the tank and its content throughout the day and night.

To reduce the temperature excursions of the tank and its contents, a canopy 22 is provided. Canopy 22 includes a roof 23 and roof structural members 24. Members 24 are coupled to side walls 12 and support roof 23 above containment vessel 11 to shade tank 14. Roof 24 also reduces the amount of rain and snow which accumulates within vessel 11. This further reduces a potential source of pollution caused by tracking of feet of any fuel, rain, and snow mixtures from within vessel 11.

Because most fuel dispensing apparatus is powered by electricity, notably pump 19 for dispensing fuel, provision is made to provide a fuel driven pump 25 for use in the event of electrical failures. Pump 25 includes its own pump-fuel storage tank 26 into which tank 14 fuel may be transferred.

As noted, pump 19 is energized by electricity. Thus, a source of electricity is required. A readily available source might be deemed to be the local electrical power utility. However, use of system 10 is envisioned in non-developed areas as in national parks, wilderness areas, and undeveloped work sites. Also, because a preferred embodiment of the invention provides system 10 as a transportable system, it will often be undesirable to bring utility power into the system. Other arrangements are provided.

In a presently preferred embodiment, solar array 27 is mounted on roof 23. Solar array 27 converts sunlight energy to electrical energy. The electricity from solar array is fed to batteries 28A (not seen) within battery case 28. Batteries 28 accumulate and store electrical energy from array 27 so that electrical power will be available to system 10 when the sun is obscured or darkness falls.

To preclude loss of operational capability due to failure of the solar array/battery electricity source, a fuel driven generator 29 is provided. Generator 29 has its own generator fuel tank 30 which can be serviced from tank 14.

It should be noted that the placement in FIG. 2 of fuel-driven pump 25 and fuel-driven generator 29 is done so for illustrative, expository purposes only. Venting and all safety requirements dictating safe placement of these devises will be adhered to in practice.

To permit operation of system 10 during hours of darkness, electric lights 31 are provided so as to light the tank and dispensing area of vessel 11. System 10 includes an emergency shut off switch 32. Switch 32 may be operated manually or remotely. To provide for remote, wireless operation, switch 32 houses a remote receiver 35 (not seen in the drawing of FIG. 2). A remote transmitter 33 is used to transmit a wireless signal 34 which, when received by remote receiver 35 actuates switch 32 to the OFF condition. This removes all electrical power to the system. Similar remote shut off arrangements can be provided to disable and fuel driven apparatus within vessel 11.

What has been disclosed is an above ground fuel storage system. A containment vessel is selected to resist impact shock, as well as deformation from fire's heat and internal Hydraulic pressures in the presence of such heat. The fuel delivery input port, the fuel tank, all fuel lines and dispensing equipment are mounted fully enclosed within the confines of the containment vessel. The containment vessel may be transportable or be permanently emplaced on use site. Solar energy is utilized to allow operation in undeveloped areas. A remote control device permits system shut down to be initiated from a distance.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, that which is claimed is:

1. In an above ground fuel storage and dispensing apparatus, comprising,
   a rectangular support frame having an outer perimeter,
   said frame including vertical side walls around the perimeter and a bottom forming an open-top containment vessel,
   a fuel tank having a predetermined volume mounted on said frame within said side walls and bottom,
   said open-top containment vessel having a volume larger than said volume of the fuel tank for containing all the fuel from the fuel tank in the event of a fuel tank leak,
   said fuel tank having a horizontal perimeter formed by the maximum horizontal dimensions of the fuel tank,
   said vertical side walls of the frame being spaced outwardly from the horizontal perimeter of the fuel tank in all horizontal directions and being of a sufficient size and strength for protecting the fuel tank from horizontal external impacts by vehicles and similar objects against the vertical side walls of the apparatus,
   a fuel line connected to said tank, and
   means for dispensing fuel to a fuel-user, said means being connected to said fuel line,
   THE IMPROVEMENT COMPRISING:
   said open-top containment vessel being fabricated of materials selected to retain said vessel's conformation under extreme conditions of fire-induced heat and hydraulic pressure;
   any said fuel line being free of supporting contact with said vertical side walls for isolating said fuel line from shock induced by impact forces imparted to said side walls;
   any said fuel line and said means for dispensing fuel being positioned and mounted within said open-top containment vessel for containing within said vessel any fuel leaks or spills from said fuel line and said means for dispensing fuel; and
   means affixed to said support frame for reducing sun heating of said fuel tank, thereby reducing the emission into the atmosphere of volatile organic compounds from said fuel tank.

2. The improvement of claim 1 wherein said means for reducing sun heating of said fuel tank, thereby reducing emissions of volatile organic compounds from said fuel tank comprises means for reducing daytime through night time temperature range variations within said tank.

3. The improvement of claim 2 wherein said means for reducing variations in temperature range within said tank further comprises means for reducing the accumulation of rain and snow within said open-top containment vessel.

4. The improvement of claim 3 wherein said means for reducing variations in temperature range within said tank and said means for reducing the accumulation of rain and snow within said open-top containment vessel further comprises a roof canopy above said open-top containment vessel.

5. The improvement of claim 2 wherein said means for reducing variations in temperature range within said tank further comprises a roof canopy above said open-top containment vessel.

6. The improvement of claim 1 wherein said means for dispensing fuel to a fuel-user comprises a pump.

7. The improvement of claim 6 wherein said pump is energized by fuel drawn from said fuel tank.

8. The improvement of claim 6 wherein said pump is electrically driven.

9. The improvement of claim 6 further comprising a source of electrical energy coupled to and contained within said open-top containment vessel for transport therewith.

10. The improvement of claim 9 wherein said source of electrical energy is a motor driven electric generator energized by fuel drawn from said fuel tank.

11. The improvement of claim 9 wherein said source of electrical energy is an electric-motor driven generator.

12. The improvement of claim 9 wherein said source of electrical energy is a solar array mounted on said open-top containment vessel for converting sunlight into electrical energy, and further comprising an electrical battery coupled to said solar array for storing excess electrical energy converted by said solar array during periods of sunlight and dispensing electrical energy during periods of obscured sunlight and darkness.

13. The improvement of claim 1 wherein said open-top containment vessel consists of essentially of reinforced concrete, said open top containment vessel being transportable; and
   said vertical side walls being so mechanically affixed to said bottom and said walls and said bottom being of sufficient size and strength to support said reinforced concrete open-top containment vessel with said fuel tank, fuel line, and dispensing means therein during transport.

14. The improvement of claim 1 further comprising:
   wireless remote control means coupled to said means for dispensing fuel for disabling said dispensing means from a remote position of safety should an emergency arise.

15. In an above ground fuel storage and dispensing apparatus, comprising,
   a rectangular support frame having an outer perimeter,
   said frame including vertical side walls around the perimeter and a bottom forming an open-top containment vessel,
   a fuel tank having a predetermined volume mounted on said frame within said side walls and bottom,
   said open-top containment vessel having a volume larger than said volume of the fuel tank for containing all the fuel from the fuel tank in the event of a fuel tank leak,
   said fuel tank having a horizontal perimeter formed by the maximum horizontal dimensions of the fuel tank,
   said vertical side walls of the frame being spaced outwardly from the horizontal perimeter of the fuel tank in all horizontal directions and being of a sufficient size and strength for protecting the fuel tank from horizontal external impacts by vehicles and similar objects against the vertical side walls of the apparatus,
   a fuel line connected to said tank, and
   means for dispensing fuel to a fuel-user, said means being connected to said fuel line,
   THE IMPROVEMENT COMPRISING:

any said fuel tank, any said fuel line and any said means for dispensing fuel all being positioned and mounted within said open-top containment vessel, free of contact with said side walls, for restricting to the interior of said open-top containment vessel any fuel leaks or spills from said tank, said fuel line and said means for dispensing fuel.

16. The improvement of claim 15 further comprising: a source of electrical energy wherein
said source of electrical energy is a solar array mounted on and above said open-top containment vessel for converting sunlight into electrical energy, and further comprising an electrical battery coupled to said solar array for storing excess electrical energy converted by said solar array during periods of sunlight and dispensing electrical energy during periods of obscured sunlight and darkness.

17. The improvement of claim 16 further comprising means affixed to said support frame for reducing sun heating of said fuel tank, thereby reducing the emission into the atmosphere of volatile organic compounds from said fuel tank.

18. The improvement of claim 16 further comprising:
wireless remote control means coupled to said means for dispensing fuel for disabling said dispensing means from a remote position of safety should an emergency arise.

19. The improvement of claim 15 further comprising:
wireless remote control means coupled to said means for dispensing fuel for disabling said dispensing means from a remote position of safety should an emergency arise.

20. The improvement of claim 19 further comprising:
means affixed to said support frame for reducing sun heating of said fuel tank, thereby reducing the emission into the atmosphere of volatile organic compounds from said fuel tank.

* * * * *